US 6,628,634 B2

(12) United States Patent
Palenius

(10) Patent No.: US 6,628,634 B2
(45) Date of Patent: Sep. 30, 2003

(54) FAST DECODING OF LONG CODES

(75) Inventor: Torgny Palenius, Löddeköpinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 09/732,864

(22) Filed: Dec. 11, 2000

(65) Prior Publication Data

US 2002/0196875 A1 Dec. 26, 2002

(51) Int. Cl.⁷ ............................................. H04B 7/216
(52) U.S. Cl. .................... 370/335; 370/342; 455/525
(58) Field of Search ................................. 455/422, 466, 455/525; 370/320, 335, 342, 441; 375/141

(56) References Cited

U.S. PATENT DOCUMENTS

| | | | | |
|---|---|---|---|---|
| 5,309,474 A | * | 5/1994 | Gilhousen et al. | 370/209 |
| 5,416,797 A | * | 5/1995 | Gilhousen et al. | 370/209 |
| 5,673,260 A | * | 9/1997 | Umeda et al. | 370/342 |
| 5,841,806 A | * | 11/1998 | Gilhousen et al. | 375/146 |
| 6,195,343 B1 | * | 2/2001 | Watanabe | 370/335 |
| 6,442,152 B1 | * | 8/2002 | Park et al. | 370/341 |
| 6,498,936 B1 | * | 12/2002 | Raith | 455/466 |

FOREIGN PATENT DOCUMENTS

| | | |
|---|---|---|
| EP | 0892503 A | 1/1999 |
| WO | WO 99/12295 A | 3/1999 |
| WO | WO 99/66754 A | 12/1999 |

OTHER PUBLICATIONS

IMT–2000 Study Committee, Air–interface WG, SWG2, Document No.: AIF/SWG2–16–5(P), "*Proposal for Fast Long Code Identification*," Texas Instruments, Mar. 30, 1998, Chapters 3.2.2.1, 3.2.4.2 and 3.2.7.9, Version 0.4.

* cited by examiner

*Primary Examiner*—Nay Maung
*Assistant Examiner*—Tan Trinh
(74) *Attorney, Agent, or Firm*—Burns, Doane, Swecker & Mathis, L.L.P.

(57) ABSTRACT

A method and apparatus for long code group determination. The long code group is determined based upon a number of symbols in a received codeword, wherein the number of symbols is less than the total number of symbols in the codeword. The long code group number can be determined either through the use of a table of code sequences or through a reduced complexity code search. The use of the of these techniques allows for a quick determination of the long code group used by a particular base station.

18 Claims, 8 Drawing Sheets

| LONG CODE GROUP NR. | CODEWORD |
|---|---|
| 1 | 1, 2, 3, 4, 5, 6, 7, 8, 9, 10, 11, 12, 13, 14, 15, 16 |
| 2 | 16, 15, 14, 13, 12, 11, 10, 9, 8, 7, 6, 5, 4, 3, 2, 1 |
| 3 | 1, 3, 5, 7, 9, 11, 13, 15, 2, 4, 6, 8, 10, 12, 14, 16 |
| 4 | 16, 14, 12, 10, 8, 6, 4, 2, 15, 13, 11, 9, 7, 5, 3, 1 |

FIG. 4

| CODE SEQUENCE | DETECTED LONG CODE GROUP | COMMENTS |
|---|---|---|
| 1,1,1 | 1 | COULD BE ANY OF THE FOUR. |
| 1,1,2 | 1 | 1,2 IS A SUBSEQUENCE IN GROUP 1. |
| 1,1,3 | 3 | 1,3 IS A SUBSEQUENCE IN GROUP 1. |
| .... | | |
| 1,2,1 | 2 | COULD BE GROUP 1 (INCLUDES 1,2) OR GROUP 2 (INCLUDES 2,1) |
| 1,2,2 | 1 | |
| 1,2,3 | 1 | |
| 1,2,4 | 3 | COULD BE GROUP 1 (1,2) OR 3 (2,4) |
| .... | | |

FIG. 5

| SYMBOL NR. | T1 | T2 | T3 |
|---|---|---|---|
| 1 | 0.3 | 0.3 | |
| 2 | 0.5 | 0.1 | |
| 3 | 0.9 | 0 | |
| 4 | 0.4 | 0.4 | |
| 5 | 0.1 | 0.5 | 0.7 |
| 6 | 0 | 0 | |
| 7 | 0 | | 0.4 |
| 8 | 0 | | |
| 9 | 0 | | |
| 10 | 0 | | |
| 11 | 0 | | |
| 12 | 0 | | |
| 13 | 0 | | |
| 14 | 0 | | |
| 15 | 0 | 0 | |
| 16 | 0 | | 0.3 |

FIG. 7

| $T_1$ | $T_2$ | $T_3$ |
|---|---|---|
| (2), 0.5 | (2,3), 0.5 | (3,4,5), 2.0 |
| (3), 0.9 | (2,1), 0.8 | (3,5,7), 1.8 |
| (4), 0.4 | (2,4), 0.9 | (3,1,16), 1.5 |
|  | (2,15), 0.5 |  |
|  | (3,4), 1.3 |  |
|  | (3,2), 1.2 |  |
|  | (3,5), 1.4 |  |
|  | (3,1), 1.2 |  |
|  | (4,5), 0.9 |  |
|  | (4,3), 0.4 |  |
|  | (4,6), 0.4 |  |
|  | (4,2), 0.5 |  |

FIG. 8

FAST DECODING OF LONG CODES

BACKGROUND

The present invention relates to digital radio systems, and more specifically, to the determination of long code groups as part of the processing of a received signal in a spread spectrum radiocommunication system.

Radiocommunication systems involve the transmission of information over an air interface, for example by modulating a carrier frequency with that information. Upon reception, a receiver attempts to accurately extract the information from the received signal by performing an appropriate demodulation technique. Some systems provide channelization using a spread spectrum technique known as code division multiple access (CDMA). In some CDMA systems, the information data stream to be transmitted can first be coded or spread using a unique spreading code and then combined with a long PN-sequence or a shorter scrambling-sequence, collectively referred to herein as "long codes". The long codes can be planned from cell to cell so that neighboring cells use different long codes. The information data stream and the long code can have the same or different bit rates. The multiplication of the information data stream with the unique spreading code and long code results in an output stream of chips.

To further understand the usage of long codes associated with signal processing in a CDMA radiocommunication system, consider the following example. FIG. 1 illustrates the use of base stations to transmit radio waves to mobile users (mobile stations) in a cellular system. In a CDMA system, base station 10 can transmit signals to mobile stations 14 and 15 as a single (composite) signal. The signal directed to mobile station 14 is typically coded with a short code that is orthogonal or mostly orthogonal to a short code that is used to code the signal directed to mobile station 15. These signals are then scrambled with a second code that is sometimes referred to as a long code, associated with base station 10. The sum of the two coded and spread signals is then transmitted by base station 10.

When mobile station 14 receives the composite signal, mobile station 14 multiplies the spread signal with the long code and the short code to recreate the signal directed to mobile station 14 and the signal directed to mobile station 15 is suppressed as interference noise. Similarly, mobile station 15 multiplies the spread signal with the long code and the short code assigned to mobile station 15 to recreate the signal directed to mobile station 15 and the signal directed to mobile station 14 is suppressed as interference noise. To perform this processing on the received signals mobile stations 14 and 15 must have identified the long code used to scramble the received signal, in addition to learning or knowing the applicable short codes and having attained time synchronization.

In an exemplary CDMA system, the mobile stations are able to identify the long code used by a particular base station by listening to a control channel known as the synchronization channel (SCH). Decoding of the SCH is performed during both an initial "power-on" synchronization phase and when measurements of neighboring base stations' SCH are performed for cell reselection. One symbol is transmitted in the SCH during every slot. The SCH consists of two subchannels, the Primary SCH (P-SCH) and the Secondary SCH (S-SCH), which are transmitted in parallel from the base station. The P-SCH always carries the same symbol. A mobile station listens to the P-SCH to detect the timing of the symbols of the S-SCH, and thereby the slot timing. After the P-SCH is detected the S-SCH is read using the P-SCH as a phase reference.

However, when in initial synchronization a mobile station has no knowledge of which particular long code in the set of all available long codes might be received. Moreover, during the initial synchronization phase, frame synchronization to the S-SCH has not yet been achieved and therefore, the mobile station has no knowledge when the first symbol in a code sequence is received. The decoder must therefore take into account that all time shifts of each available long codeword can be received as part of its attempt to identify the long code needed to scramble a particular SCH's transmission.

As mentioned above, mobile stations 14 and 15 may be performing measurements on signals from other base stations in surrounding cells, i.e., base stations 20, 30 and 40, while communicating with base station 10 to ensure that they are currently communicating with the best base station (s). In order to perform the measurements it is necessary to determine the long codes used by the various base stations. When mobile stations 14 and 15 are in the measurement mode they may receive a list of neighboring base stations and which long code group they are using. Hence, the search for specific codewords becomes limited, e.g., identifying one codeword out of a group of sixteen.

It is desirable to perform the determination of the long codes as quickly as possible. For example, when an inter-frequency handover is prepared, measurements of base stations on other frequencies must be performed. Therefore, the time for each measurement should be minimized because the normal traffic to the terminal is interrupted when measurements are performed on other frequencies. Additionally, since mobile stations typically use batteries as a source of power, it is desirable to perform the decoding quickly, in order to use less power. Further, by performing the decoding quickly, the required amount of hardware is minimized because the measurement hardware can be time shared.

In conventional systems, a correlation for all 16 symbols are performed for the 15 symbols over the frame. Then all long code group code sequences in any of the 15 phases are used for correlation with the received sequence and the sequence with the highest correlation value is selected as being the correct long code group. Performing the correlations according to this conventional method requires a complex decoder because of the many operations which are required. For example, if there are 32 long code groups, then the number of sequences which are used as candidates are 15*32=480. Thus, the correlations for 480 sequences must be calculated and the best one shall be selected. Another drawback of this conventional method is that it requires a considerable amount of buffering to perform the required correlations. Further, if the number of long code groups are increased, the decoding complexity is substantially increased. Accordingly, a method and apparatus for performing long code group detection using less than the total number of symbols in the codewords would be desirable.

SUMMARY

The present invention relates to reducing the number of bits or symbols which need to be evaluated in order to determine the particular long code group associated with the particular long code used to scramble transmissions by a particular base station. According to exemplary embodiments of the present invention, a broadcast control channel includes a synchronization bit or symbol in each of a plurality of time slots. The sequential nature of these bits or symbols can be used by the receiver to determine which long code group corresponds to the received code sequence.

According to one exemplary embodiment of the present invention, a table of code sequences is built. The received symbols are compared to the table and a determination is made as to the detected long code group. In an alternate exemplary embodiment of the present invention, an iterative process is used to determine a sequence of symbols which identify a particular long code group through the use of hard or soft metrics.

Since the present invention does not require the decoding and correlation of all of the symbols of a long code group to uniquely identify the long code group, the complexity of decoding is decreased due to the reduced amount memory required for buffering the received code sequence. Further, the complexity of decoding is decreased since it is not necessary to determine the metric of all of the symbols in the received code sequence.

BRIEF DESCRIPTION OF THE DRAWINGS

The present invention will now be described with reference to the accompanying drawings in which:

FIG. 4 is a table which illustrates exemplary long code group numbers and the corresponding codewords;

FIG. 5 is a table which illustrates exemplary received code sequences and the corresponding detected long group code group number;

FIG. 7 is table which illustrates received symbols and corresponding metrics at different time periods; and FIG. 8 is a table which illustrates candidate sequences and surviving sequences.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using a hybrid TDMA/CDMA methodology, in which communication between the base station and the mobile terminals is performed using spreading and scrambling codes, but wherein information is also conveyed in discrete time slots. However, those skilled in the art will appreciate that the concepts disclosed herein may find use in other access methodologies. Likewise, some of the exemplary embodiments provide illustrative examples relating to an exemplary frame and logical channel structure which is under consideration for certain third generation radiocommunication systems, however, the techniques described herein are equally applicable to equipment used in any system.

Figure 2:
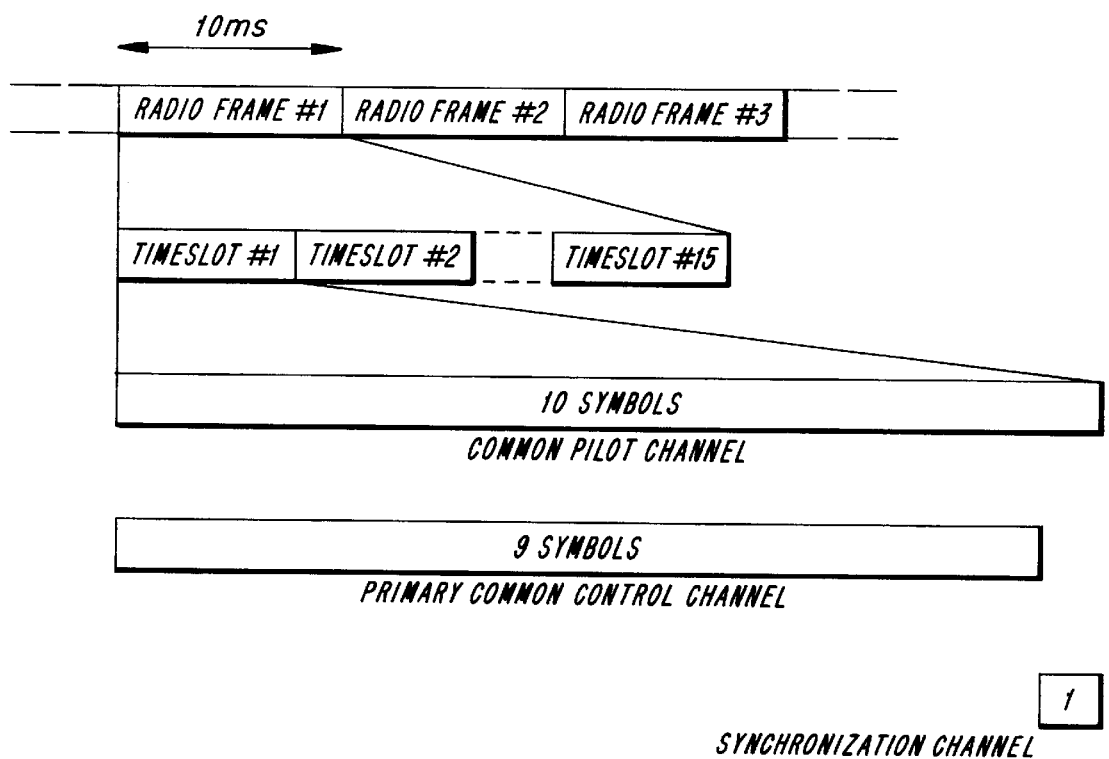
FIG. 2 depicts an exemplary physical and logical channel structure in which the present invention can be implemented.

When the first frame of a desired information signal is received by a receiver, in most communication systems, the clock at the transmitter and the clock at the receiver are not "locked", i.e. they are not synchronized in time. One part of this locking procedure is commonly referred to as frame synchronization. For the purposes of illustration, and not limitation, consider the exemplary frame and logical channel format depicted in FIG. 2. Therefore, although a specific number of radio frames are used in the description of an exemplary embodiment of the present invention, one of ordinary skill in the art would be able to implement the present invention using a different number of radio frames per superframe. Therein seventy-two radio frames of 10 ms each make up a superframe. Within each radio frame there are fifteen timeslots. Each time slot includes various types and fields of information, depending upon the channel to which it corresponds. In FIG. 2, three such channels, primary common control physical channel (P-CCPCH), the common pilot channel (CPICH) and SCH, are depicted.

These three channels are broadcast control channels transmitted by the base station to all of the mobile stations in the area serviced by that base station, e.g., using different short codes known a priori by the mobiles. As can be seen in the figure and as described above, the SCH includes one synchronization symbol (or bit) per timeslot. The synchronization symbol (or bit) in the S-SCH can be used for determination of the long code group as described below. CPICH carries pilot symbols which can be used by a receiver, for example, to perform channel estimation. The P-CCPCH is a logical information channel which can carry varying types of overhead information, e.g., identifying a network operator, sector, etc.

A first exemplary embodiment of the present invention will now be described in conjunction with FIG. 3 and FIG. 4 which depict an exemplary method for identifying long code groups and a table of long code groups and their corresponding codewords, respectively. In accordance with the purely illustrative embodiment, it is desirable to determine the long code group using the minimum number of symbols required to uniquely identify the codeword at step 310. In the example of FIG. 4, three symbols are necessary to uniquely detect the codeword. The minimum number of symbols required to uniquely identify a codeword can be determined by a full search of the codewords. For example, initially all codewords could be searched to determine whether each codeword can be uniquely identified by two adjacent symbols. If it is determined that the codewords cannot be uniquely identified by two adjacent symbols, then all the codewords are searched to determine whether each codeword can be uniquely identified by three adjacent symbols. This process is repeated and the number of symbols is increased by one each iteration, until it is determined that each codeword can be uniquely identified. The process for determining the number of symbols which are required to uniquely identify a codeword is merely exemplary, and one skilled in the art will recognize that other methods can be implemented for determining the minimum number of symbols for uniquely identifying a codeword.

In step 320, a table of all possible code sequences is built based upon the minimum number of symbols necessary to uniquely detect the codeword, as determined in step 310. This table is illustrated in FIG. 5. The first column is a description of the detected code sequence, the second column shows which long code group corresponds to a particular code sequence, and the third column contains comments for code sequences which correspond to codewords from more than one long code group. The codewords or bits are received from the S-SCH channel, in step 330. Then in step 340 the received codewords are compared to the code sequences of FIG. 5. Based upon the comparison in step 340 the long code group is determined in step 350.

Figure 3:
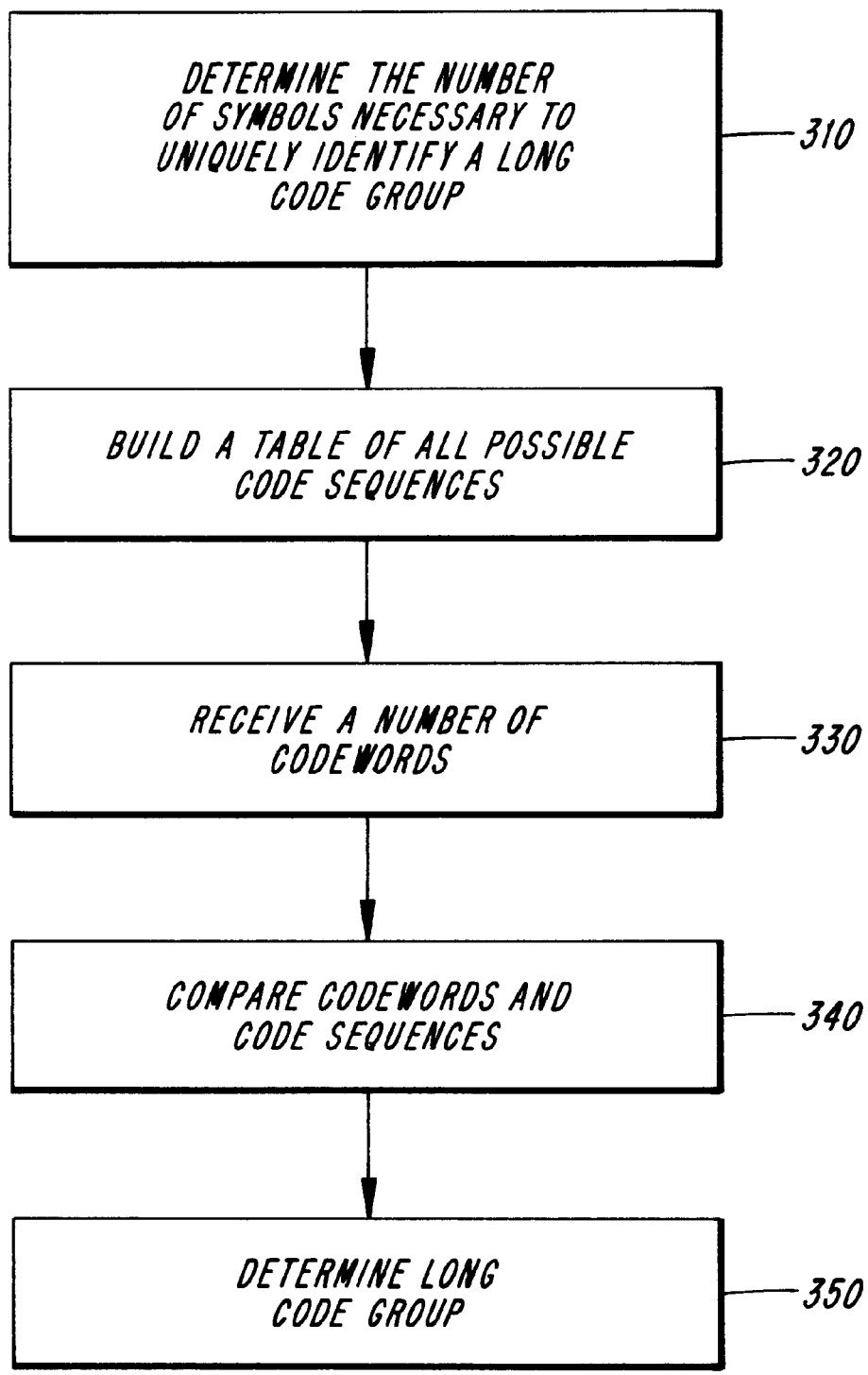
FIG. 3 illustrates an exemplary method according to an exemplary embodiment of the present invention.

If each long code group may include more than one long code an additional step would be added to the method of FIG. 3. In this step, the mobile station would try to find the correct long code in the long code group by testing all of the long codes to determine which long code is the correct long code. Since the number of long codes in the long code group is small and since the timing has been determined by the determination of the long code group, there is only a minimal amount of processing required by the mobile station to determine which long code out of the long code group is the correct long code.

It will be recognized that there are code sequences in the first column in the table of FIG. 5 which do not correspond to long code group codewords. These code sequences are provided to identify the long code group when there are reception errors in the codewords. For example, the second row of FIG. 5 contains the code sequence 1,1,2. However, referring to FIG. 4, there are no codewords which contain the code sequence 1,1,2. Accordingly, it is assumed that the first symbol 1 is a reception error. Using the two remaining symbols, it is determined that long code group 1 contains a code sequence of 1,2, and hence, long code group 1 would be selected.

Referring to FIG. 5, it will be recognized that due to reception errors, more than one long code group could be associated with a received code sequence. When this occurs, the first long code group in the table could be selected as being the long code group which is associated with the received code sequence. Alternately, the long code group can be randomly selected from the group of possible long code groups. Using either of these methods, a mobile station can attempt to decode the received traffic channel signals using the selected long code group, and if it is determined that the signals are not being correctly decoded, the mobile station can attempt to decode the received traffic channel signals using another of the remaining long code groups, until the proper long code group has been identified. Alternatively, instead of attempting to decode the received traffic channel using another of the remaining long code groups, the mobile station can reattempt the decoding of the incoming long codes, e.g., the mobile station can restart the method illustrated in FIG. 3.

It can be seen that the method illustrated in FIG. 3 requires very large tables. Further, the length of the tables increases as the minimum number of symbols necessary to uniquely determine a long code group increases. In order to avoid the use of large tables, FIG. 6 illustrates an alternative embodiment of the present invention for long code group determination which involves a reduced complexity code search.

Figure 6:
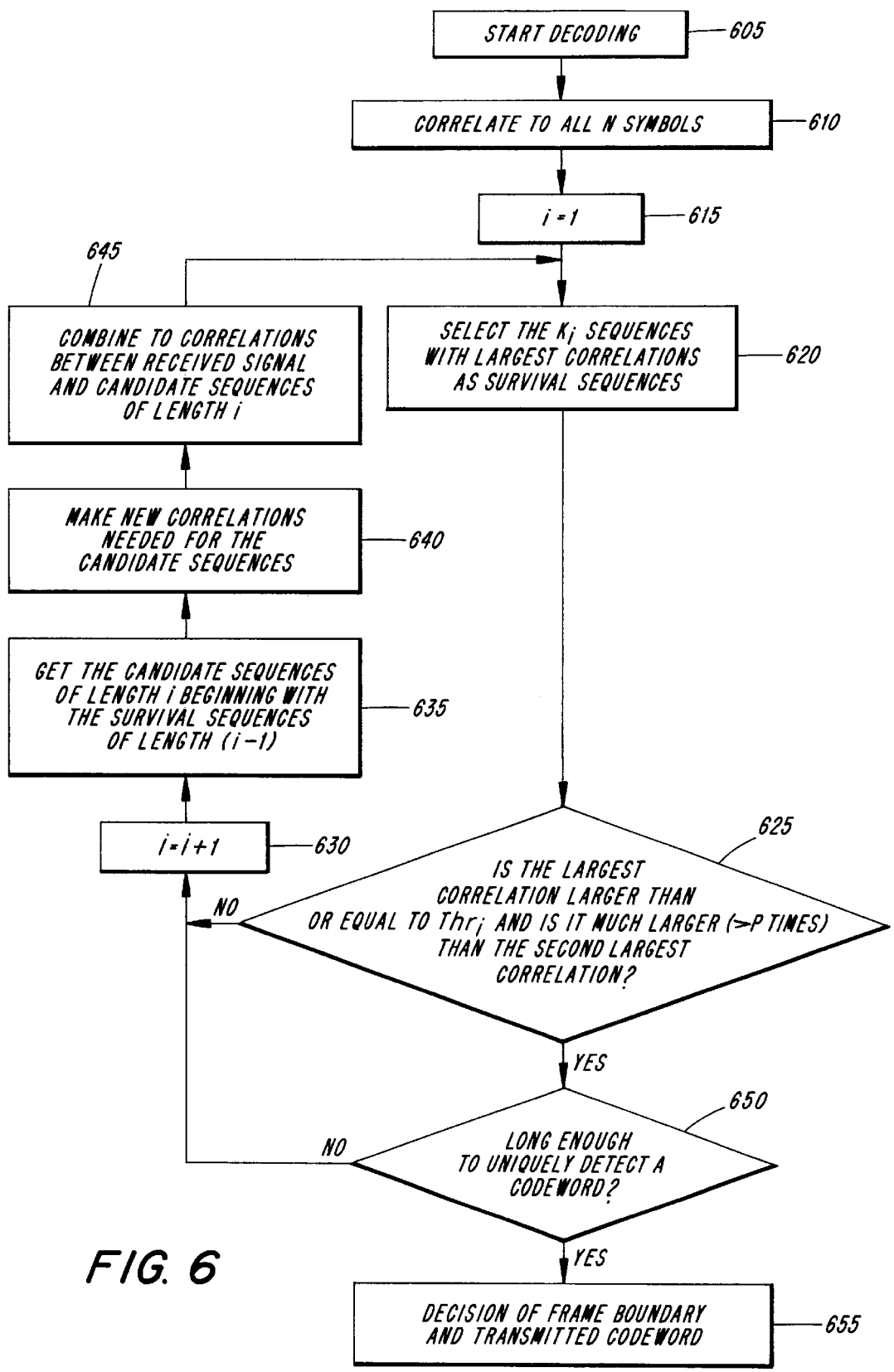
FIG. 6 is a flowchart illustrating an alternate method according to a second exemplary embodiment of the present invention.

In the embodiment of FIG. 6 soft or hard metrics from the matched filters are used directly for decoding the received data. The following method has several variables and for this exemplary embodiment the variables are set such that $K_i=3$, $Thr_i=2$ and $P=1.1$. $K_i$ represents the number of symbol sequences which survive elimination in stage i, these sequences are herein referred to as surviving sequences. The value for $K_i$ could be a different value for each stage, e.g., to minimize the chance of throwing out a correct sequence $K_i$ could be set to a larger value for the first and second iterations of the method described below, i.e., for i=1 and i=2. $Thr_i$ is the metric for a decision at step i, which can change for each iteration, i.e., for each i. The value of the $Thr_i$ is selected based in part on the type of correlator used. P is the ratio between the largest metric and the next largest metric and is selected so that the sequences are long enough to provide the correlator with a good selection of sequences. The description of FIG. 6 will include in a purely exemplary embodiment the long code groups of FIG. 4 and will be described in conjunction with the tables of FIGS. 7 and 8.

The decoding begins at step 605. In step 610, the received waveform is correlated to all N symbols, wherein N is equal to the number of symbols contained in the codeword alphabet. In the current exemplary embodiment the alphabet contains the numbers 1–16, therefore, as illustrated in FIG. 7, the received waveform is correlated to all 16 symbols. In step 615, i is set equal to one. In step 620, the $K_1=3$ sequences with the largest correlation values are selected as survival sequences. In this example the table in FIG. 7 shows that at time $T_1$ the three symbols with the highest correlation values are 2, 3, and 4 having metrics of 0.5, 0.9 and 0.4, respectively. In step 625 it is determined whether the value of the largest correlation is larger than or equal to $Thr_i$ and whether the largest correlation is P times larger than the second largest correlation. In the table of FIG. 8 it can be seen that the received symbol 3 has the highest metric, i.e., 0.9. Although 0.9 is greater than P times the second largest metric, i.e., 0.9>1.1*0.5, the metric is less than the threshold of 2. Since the answer to one of the two questions in step 625 is no, i is incremented by 1 in step 630.

In step 635, the survival sequences from step 620 are used in the determination of the candidate sequences. In this example, the survival sequences are the symbols 2, 3, and 4 which are compared to the codewords of FIG. 4. A comparison reveals that each of the codewords corresponding to the long code groups contain one 2, one 3, and one 4. Therefore in step 635, there will be three candidates from each of the four codewords, for codeword 1 there will be candidates (2,3), (3,4), and (4, 5), for codeword 2 the candidates will be (2,1), (3,2), and (4,3), for codeword 3 the candidates will be (2,4), (3,5), and (4,6), finally for codeword 4 the candidates will be (2, 15), (3,1), and (4,2).

In step 640 new correlations are made for the candidate sequences, which are illustrated in column $T_2$ of FIG. 7. The correlations between received signal and candidate sequences of length i=2 are combined in step 645. This occurs by adding the metric of the first number of the sequence at time $T_1$ with the second number of the sequence at $T_2$. The result of this operation is shown in the second column of FIG. 8. The process then returns to step 620 and the $K_2=3$ surviving sequences from FIG. 8, i.e., those with the largest metrics, are selected. In the present example the sequences chosen are (3,4), (3,5), and (3,1) with metrics of 1.3, 1.4, and 1.2, respectively. Although the sequence (3,2), like the sequence (3,1), has a metric of 1.2, it is not chosen since only the three largest metrics are chosen. However, this decision is arbitrary and the sequence (3,2) could be chosen over the sequence (3,1). Further, one skilled in the art will recognize that when two sequences have the same metric both sequences can be selected. However, this would result in an increased decoding complexity, due to the increased number of sequences which are required to be decoded in the steps described below.

In step 625 it is determined that the metric 1.4 is less than $Thr_2$. Therefore, i is incremented by one in step 630, and the candidate sequences of length 3 are chosen in step 635. A comparison of the surviving sequence above with the codewords of FIG. 4 indicates that there are only three candidate sequences produced from the surviving sequences. New correlations for time $T_3$ are calculated and the correlations are combined with the candidate sequences in steps 640 and 645. FIG. 8 shows that the three candidate sequences at time $T_3$ are (3,4,5), (3,5,7), and (3,1,16) with metrics of 2.0, 1.8, and 1.5, respectively. These sequences are selected as survival sequences in step 620.

In step 625 it is determined that candidate sequence (3,4,5) has the necessary metric greater than the threshold of 2.0 and is greater than 1.1 times the second largest correlation, i.e., (3,5,7). Then in step 650 it is determined whether the code sequence is long enough to uniquely detect a code word. The determination of whether the code sequence is long enough to uniquely detect a code word can be performed as described above with regard to FIG. 3, or by using any other known method. If it is determined that the code sequence is not long enough to be uniquely detected then the length of the metrics is incremented by one in step 630 and proceeds as described above. If it is determined in step 650 that the code sequence is long enough to be uniquely detected then a decision can be made as to the frame boundary and the transmitted codeword. Hence, candidate sequence (3,4,5) indicates that long code group 1 should be chosen.

Although it has been mentioned that the result attained in step 655 can be used for the determination of a frame boundary, a description of how to implement such a determination is not particularly relevant to this description. However, the interested reader is referred to U.S. patent application Ser. No. 09/100,233 "Frame Synchronization Techniques and Systems for Spread Spectrum Radiocommunication" filed Jun. 19, 1998, the disclosure of which is incorporated here by reference.

Figure 1:
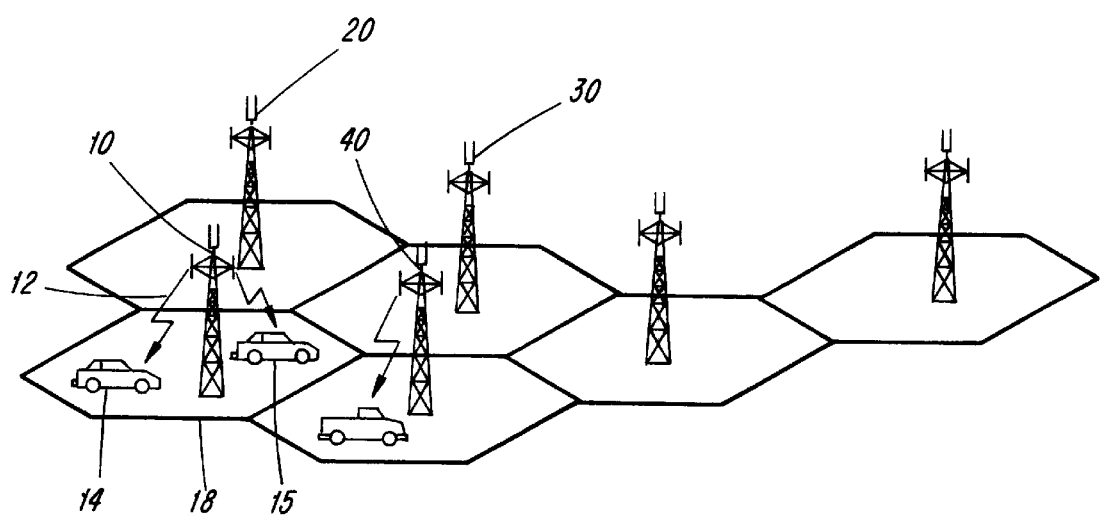
FIG. 1 illustrates a cellular radiocommunication system.

The present invention could be advantageously used in a CDMA system which operates across at least two frequency bands. For example, referring to FIG. 1, if base stations 10, 20, 30 and 40 each operated on a different frequency band, in order for a mobile station to make measurements on surrounding base stations, the mobile station would have to switch frequencies. Since a mobile station may be in communication with base station 10, the mobile station would require a second receiver to simultaneously receive signals over two different frequency bands. However, since according to the present invention a mobile station only needs to receive part of the synchronizing sequence, the mobile station can use the remaining time for which it would normally receive the remainder of the synchronizing sequence, for measuring on different frequency bands.

The present invention has been described by way of exemplary embodiments to which the invention is not limited. Modifications and changes will occur to those skilled in the art without departing from the spirit and scope of the invention as defined in the appended claims.

What is claimed is:

1. A method for identifying a long code group comprising the steps of:
   determining a number of symbols necessary for uniquely detecting a long code group;
   building a table of all code sequences with a length equal to the number of symbols necessary for uniquely detecting a long code group;
   receiving a number of codewords, wherein said number of codewords are equal to said number of symbols necessary for uniquely detecting a long code group;
   comparing said number of codewords with the table of all code sequences; and
   identifying said long code group base upon said comparison.

2. The method of claim 1, wherein the step of determining a number of symbols necessary for uniquely detecting a long code group comprises the steps of:
   searching all codewords to determine whether each codeword can be uniquely identified by a first number of adjacent symbols; and
   if each codeword cannot be uniquely identified by the first number of adjacent symbols then increasing the first number of adjacent symbols by one symbol and repeating the searching step.

3. The method of claim 1, wherein the codewords are received from a control channel.

4. The method of claim 1, wherein if more than one code sequence matches the number of received codewords, then the comparing step comprises the step of:
   attempting to decode received traffic channel signals using a long code group associated with each code sequence.

5. A method for decoding a codeword corresponding to a long code group, wherein a waveform is received and a first number of symbols are correlated with said received waveform to determine metrics corresponding to each of said number of symbols, further comprising the steps of:
   selecting a first number of sequences with the largest metrics;
   comparing a metric of the sequence with the largest metric of said first number of sequences with a threshold;
   comparing the metric of the sequence with the largest metric with a metric of the sequence with the second largest metric of said first number of sequences;
   determining whether said sequence with the largest metric of said first number of sequences is long enough to uniquely detect a codeword; and
   selecting said sequence with the largest metric as the codeword corresponding to said long code group if metric of the sequence with the largest metric of said first number of sequences is greater than said threshold, a certain factor greater than said metric of the second largest metric of said first number of sequences, and the sequence with the largest metric of the first number of sequences is long enough to uniquely detect.

6. The method of claim 5 further comprising the step of:
   selecting a second number of sequences with the largest metrics as candidate sequences if the largest metric of said first number of sequences is: less than said threshold, or not a certain factor greater than said second largest metric of said first number of sequences, or not long enough to uniquely detect.

7. The method of claim 6, wherein said step of selecting said second number of sequences further comprises the steps of:
   determining a number of said candidate sequences using said first number of sequences with the largest metrics;
   correlating a second number of symbols with said received waveform to determine metrics corresponding to each of said second number of symbols;
   calculating a total metric of each of said number of candidate sequences by combining metrics of said first number of symbols and metrics of said second number of symbols which correspond to each candidate sequence.

8. The method of claim 7, further comprising the steps of:
   repeating the steps of claim 2 using said candidate sequences in place of said first number of sequences.

9. The method of claim 7, wherein the waveform is received in a control channel.

10. An apparatus for determining a long code group comprising:

means for determining a number of symbols necessary for uniquely detecting a long code group;

means for building a table of all code sequences with a length equal to said number of symbols necessary for uniquely detecting a long code group;

means for receiving a number of codewords, wherein said number of codewords are equal to said number of symbols necessary for uniquely detecting a long code group;

means for comparing said number of codewords with the table of all code sequences; and means for determining said long code group base upon said comparison.

11. The apparatus of claim 10, wherein the means for determining a number of symbols necessary for uniquely detecting a long code group comprises:

means for searching all codewords to determine whether each codeword can be uniquely identified by a first number of adjacent symbols; and means for increasing the first number of adjacent symbols by one symbol and repeating the searching step, if each codeword cannot be uniquely identified by the first number of adjacent symbols.

12. The apparatus of claim 10, wherein the codewords are received from a control channel.

13. The apparatus of claim 10, wherein the apparatus is a mobile station.

14. An apparatus for decoding a codeword corresponding to a long code group, wherein a waveform is received and a first number of symbols are correlated with said received waveform to determine metrics corresponding to each of said number of symbols, further comprising:

means for selecting a first number of sequences with the largest metrics;

means for comparing a metric of the sequence with the largest metric of said first number of sequences with a threshold;

means for comparing the metric of the sequence with the largest metric with a metric of the sequence with the second largest metric of said first number of sequences;

means for determining whether said sequence with the largest metric of said first number of sequences is long enough to uniquely detect a codeword; and means for selecting said sequence with the largest metric as the codeword corresponding to said long code group if metric of the sequence with the largest metric of said first number of sequences is greater than said threshold, a certain factor greater than said metric of the second largest metric of said first number of sequences, and the sequence with the largest metric of the first number of sequences is long enough to uniquely detect.

15. The apparatus of claim 14 further comprising:

means for selecting a second number of sequences with the largest metrics as candidate sequences if the largest metric of said first number of sequences is: less than said threshold, or not a certain factor greater than said second largest metric of said first number of sequences, or not long enough to uniquely detect.

16. The apparatus of claim 15, wherein said means for selecting said second number of sequences further comprises:

means for determining a number of said candidate sequences using said first number of sequences with the largest metrics;

means for correlating a second number of symbols with said received waveform to determine metrics corresponding to each of said second number of symbols;

means for calculating a total metric of each of said number of candidate sequences by combining metrics of said first number of symbols and metrics of said second number of symbols which correspond to each candidate sequence.

17. The apparatus of claim 16, wherein the apparatus is a mobile station.

18. The apparatus of claim 14, wherein the waveform is received from a control channel.

* * * * *